(12) United States Patent
Gilbertson et al.

(10) Patent No.: US 8,833,627 B2
(45) Date of Patent: Sep. 16, 2014

(54) DUAL OPERATING MODE PLASTIC FASTENER DISPENSING HANDTOOL

(75) Inventors: Daniel Gilbertson, Grafton, MA (US); David E. Herring, Shrewsbury, MA (US); Jeffrey A. Raymond, Leominster, MA (US)

(73) Assignee: Avery Dennison Corporation, Glendale, CA (US)

( * ) Notice: Subject to any disclaimer, the term of this patent is extended or adjusted under 35 U.S.C. 154(b) by 522 days.

(21) Appl. No.: 13/024,550

(22) Filed: Feb. 10, 2011

(65) Prior Publication Data

US 2011/0226833 A1    Sep. 22, 2011

Related U.S. Application Data

(60) Provisional application No. 61/303,352, filed on Feb. 11, 2010, provisional application No. 61/373,517, filed on Aug. 13, 2010, provisional application No. 61/406,602, filed on Oct. 26, 2010.

(51) Int. Cl.
   *B65C 7/00* (2006.01)

(52) U.S. Cl.
   CPC .. *B65C 7/00* (2013.01); *B65C 7/005* (2013.01)
   USPC .................................. 227/67; 227/8; 227/71

(58) Field of Classification Search
   CPC ................................. B65C 7/00; B65C 7/005
   USPC ................................................. 227/67, 71, 8
   See application file for complete search history.

(56) References Cited

U.S. PATENT DOCUMENTS

| 3,734,375 | A |   | 5/1973  | Bone et al.          |
|-----------|---|---|---------|----------------------|
| 3,924,788 | A | * | 12/1975 | Furutu ......... 227/67 |
| 4,610,384 | A |   | 9/1986  | Duchin et al.        |
| 4,610,385 | A |   | 9/1986  | Duchin               |

(Continued)

FOREIGN PATENT DOCUMENTS

| AU | 19700012430 | 9/1971 |
| CN | 1136332     | 11/1996 |

(Continued)

OTHER PUBLICATIONS

International Search Report and Written Opinion dated Jun. 16, 2011 for International Application No. PCT/US2011/024299.

(Continued)

*Primary Examiner* — Michelle Lopez
(74) *Attorney, Agent, or Firm* — Avery Dennison Corporation

(57) ABSTRACT

A dual operating mode hand tool for dispensing plastic fasteners and a method for transitioning the hand tool from a first operating mode to a second operating mode is provided. The hand tool tagging gun can be used both to dispense a plastic fastener to attach labels, price tags or other items to articles, and also to dispense a plastic fastener to maintain certain articles of clothing in a folded condition. The hand tool has a gun shaped casing, a hollow needle, a needle assembly, a trigger, a locking switch, a safety button, and a hinged anvil. In the first operating mode the hand tool is best adapted to dispense plastic fasteners to maintain an article of clothing in a folded condition. In the second operating mode the hand tool is best adapted to dispense plastic fasteners to attach labels, price tags, or other items to an article of clothing.

22 Claims, 8 Drawing Sheets

(56) References Cited

U.S. PATENT DOCUMENTS

| | | | |
|---|---|---|---|
| 4,673,120 A | | 6/1987 | Strausburg |
| 4,681,248 A | | 7/1987 | Duchin |
| 5,024,365 A | * | 6/1991 | Bourque .................... 227/67 |
| 5,305,939 A | | 4/1994 | Deschenes et al. |
| 5,307,975 A | | 5/1994 | Deschenes et al. |
| 5,501,002 A | * | 3/1996 | Fukami .................... 29/811.2 |
| 5,639,006 A | | 6/1997 | Kim |
| 5,683,025 A | | 11/1997 | Grendol |
| 5,772,073 A | | 6/1998 | Deschenes |
| 5,813,589 A | | 9/1998 | Kim et al. |
| 5,950,901 A | | 9/1999 | Kubota et al. |
| 6,267,285 B1 | * | 7/2001 | Raymond et al. ............ 227/67 |
| 6,533,155 B1 | | 3/2003 | Kubota et al. |
| 6,752,307 B2 | | 6/2004 | Raymond |
| 6,837,143 B2 | | 1/2005 | Inoue |
| 6,837,413 B1 | * | 1/2005 | Raymond et al. ............ 227/67 |
| 7,331,497 B2 | * | 2/2008 | Cooper et al. ............... 227/67 |
| 2004/0035904 A1 | | 2/2004 | Kunreuther |
| 2011/0220701 A1 | * | 9/2011 | Gilbertson et al. ........... 227/67 |
| 2012/0217281 A1 | | 8/2012 | Davis et al. |

FOREIGN PATENT DOCUMENTS

| | | |
|---|---|---|
| CN | 1556763 | 12/2004 |
| CN | 1617816 | 5/2005 |
| WO | 0051792 | 9/2000 |
| WO | 2005005265 | 1/2005 |

OTHER PUBLICATIONS

International Search Report and Written Opinion dated Jun. 16, 2011 for International Application No. PCT/US2011/024302.

International Search Report and Written Opinion dated Jun. 16, 2011 for International Application No. PCT/US2011/024304.

The State Intellectual Property Office of P.R.C. Search Report dated Nov. 25, 2013 for Chinese Application No. 2011800185125.

The State Intellectual Property Office of P.R.C. Search Report dated Nov. 25, 2013 for Chinese Application No. 2011800185021.

* cited by examiner

DUAL OPERATING MODE PLASTIC FASTENER DISPENSING HANDTOOL

CROSS REFERENCE TO RELATED APPLICATIONS

The present application claims the benefit of U.S. Provisional Application Nos. 61/303,352 filed Feb. 11, 2010, 61/373,517 filed Aug. 13, 2010, and 61/406,602 filed Oct. 26, 2010, all of which are incorporated herein by reference in their entireties.

FIELD OF THE INVENTION

A hand tool for dispensing plastic fasteners and a method of using the same. More particularly, the invention relates to a dual operating mode hand tool for dispensing plastic fasteners, and a method for transitioning the hand tool from a first operating mode to a second operating mode.

BACKGROUND OF THE INVENTION

The present invention relates to a hand tool for dispensing plastic fasteners, and more particularly to a novel plastic fastener dispensing hand tool that can be operated in an exposed stationary needle mode and an unexposed articulating needle mode.

Plastic fasteners of the type having an elongated flexible filament having a first enlargement at one end of the flexible filament and a second enlargement at the opposite end are well-known in the art and widely used in a variety of retail and other applications. One common application for this type of plastic fastener is to attach labels, price tags or other items to articles such as garments, apparel items and other consumer goods. Another common application for this type of plastic fastener is to maintain certain articles of clothing (i.e. men's dress shirts) in a folded condition so as to minimize any wrinkling of the article and so as to present the article in an otherwise flattering manner.

Two different types of plastic fastener dispensing hand tools (often referred to as "tagging guns") are required to accomplish each of these common applications. A tagging gun having an exposed stationary needle is required for the purpose of using the plastic fasteners to attach labels, price tags, or other items to an article. A tagging gun having an unexposed articulating needle is required for the purpose of using the plastic fasteners to maintain certain articles of clothing in a folded condition. Tagging guns having an exposed stationary needle are known, examples of such tools including those disclosed in U.S. Pat. Nos. 5,639,006, 5,683,025, and 5,772,073. Tagging guns having an unexposed stationary needle are also known, examples of such tools including those disclosed in U.S. Pat. Nos. 6,267,285, 6,837,413, and 7,331,497. Publications, patents and patent applications are referred to throughout this disclosure. All references cited herein are hereby incorporated by reference.

The exposed stationary needle tagging gun and the unexposed articulating needle tagging gun are adopted to perform only the respective single function stated above. Accordingly, in a workplace where it is necessary to attach labels, price tags, or other items to articles and also to maintain certain articles of clothing in a folded condition, both types of tagging guns must be used. This is undesirable for several reasons. First, the presence of two types of tagging guns around the workplace creates unnecessary clutter, which can result in an unorganized, disordered work environment. Next, a worker performing both the task of using the plastic fasteners to attach labels, price tags, or other items to articles and also using the plastic fasteners to maintain certain articles of clothing in a folded condition must carry around both types of tagging guns, or alternatively must continually return to a stock room to retrieve the required tagging gun, thereby reducing worker efficiency. Additionally, a worker assigned to perform both of these tasks must be trained and familiarized with the operation of both types of tagging guns, which can lead to increased employee costs. Finally, two different sets of parts must readily be available at all times to facilitate the repair of the two types of tagging guns. This means that two separate sets of parts must be ordered, shipped, received, organized and inventoried, leading to an additional increase in employee costs, further decreasing employee productivity, and further creating the potential for an unorganized, disordered work environment.

The exposed stationary needle tagging gun presents the additional problem of accidental needle breakage and inadvertently causing injury to a worker, as the pointed end of the needle is constantly exposed in this type of tagging gun. While some sort of needle protection device is often provided with the exposed stationary needle tagging gun to cover the needle when not in use, the needle protection device does nothing to protect against needle breakage, and often becomes lost once the tagging gun is introduced into the workplace.

What is needed is an improved tagging gun that is able to perform more than a single function, as well a tagging gun that can better protect against needle breakage and worker injury.

BRIEF SUMMARY OF THE INVENTION

By providing a single tagging gun that can be used both to dispense a plastic fastener to attach labels, price tags or other items to articles, and also to dispense a plastic fastener to maintain certain articles of clothing in a folded condition, the present invention overcomes the above identified problems associated with using two separate tagging guns. Additionally, the present invention advantageously reduces the risk of needle breakage and worker injury.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a dual operating mode hand tool for dispensing plastic fasteners. The hand tool has a gun shaped casing. The gun shaped casing has a barrel portion, a handle portion and a channel portion. The casing has a needle assembly opening at the front of the barrel portion and a trigger slot on the front of the handle portion. The hand tool further has a hollow needle and a needle assembly. The needle assembly is slidably movable back and forth between a retracted position substantially disposed within the casing and an extended position disposed substantially out of the casing through the needle assembly opening. The needle is disposed on one end of the needle assembly. The hand tool further has a trigger that is pivotally mounted within the casing and extends out from the trigger slot. The trigger is capable of moving the needle assembly between the retracted position and the extended position. The tool further has a locking switch that is capable of selective locking the needle assembly in the extended position, and a safety button that is capable of preventing the needle assembly from moving from the retracted position. The tool further has an anvil having a front portion and a rear portion. The rear portion of the anvil is secured to the casing. The front portion of the anvil is rotatably attached to the rear portion. The front portion is capable of being rotated to a first position where the front portion extends in front of the needle opening, or a second position where the front portion extends towards the bottom of the channel portion.

The present invention also relates to a method of transitioning the hand tool from a first operating mode to a second operating mode. The method comprises the steps, initially providing a hand tool having a gun shaped casing having a barrel portion, a handle portion, and a channel portion. The casing has a needle assembly opening at the front of the barrel portion. The hand tool further has a hollow needle, a needle assembly, a trigger, a locking switch, a safety button, and an anvil. The anvil has a front portion and a rear portion. The method then includes the step of rotating the front portion of the anvil from a first operating mode position near the front of the barrel portion to a second operating mode position near the channel portion. Next, depressing the safety button and moving the safety switch to an unlocked position. Then, actuating the trigger to advance the needle assembly from a first operating mode position at the rear of the barrel portion to a second operating mode position at the front of the barrel portion. Finally, the method includes the step of releasing the safety switch to lock the needle assembly in the second operating mode position.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Figure 1:
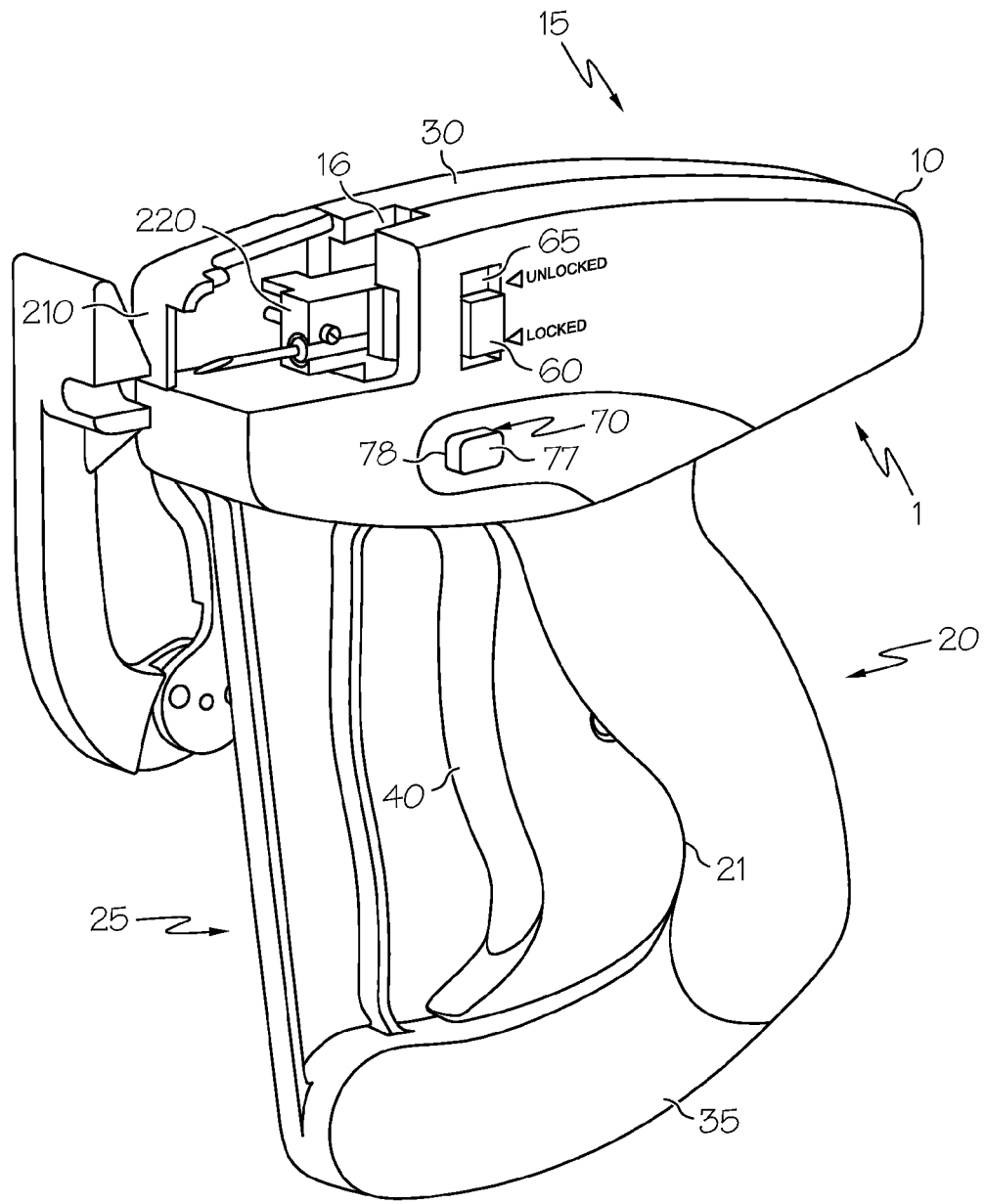
FIG. 1 is perspective view of the front left side of the present invention in an unexposed articulating needle operating mode.
Figure 2:
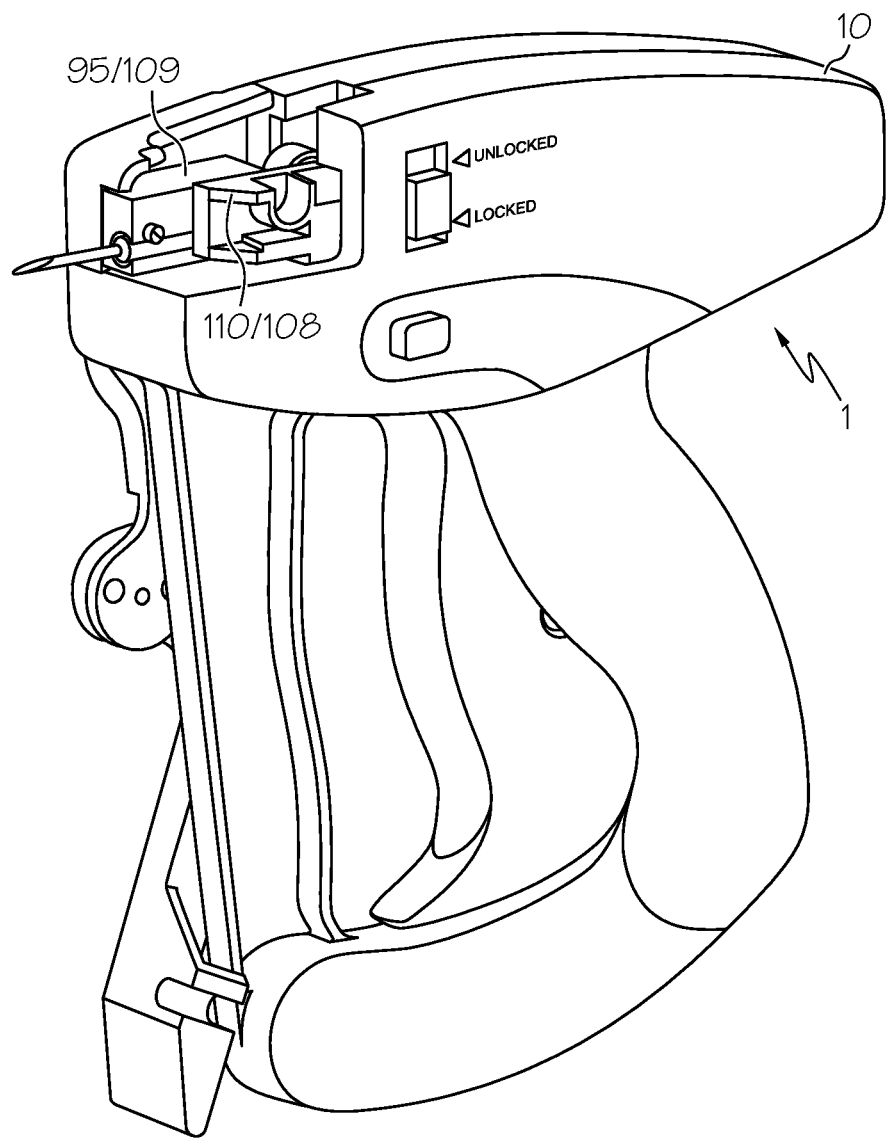
FIG. 2 is a perspective view of the front left side of the present invention in an exposed stationary needle operating mode.

Referring now to FIGS. 1 and 2, a dual operating mode plastic fastener dispensing hand tool 1 is shown. It should be noted that portions of the hand tool 1 not pertinent to the present invention are neither shown nor described in detail herein. The hand tool 1 has a gun shaped housing 10. The gun shaped housing 10 has a barrel portion 15, a handle portion 20 and a channel portion 25. The housing 10 is comprised of a right half 30 and a left half 35. The halves 30, 35 jointly define a needle assembly opening 16 located at the front of the barrel portion 15, and a trigger slot 21 located at the front of the handle portion 20. A limiter wall 210 is formed at the front of the right half 30 of the barrel portion 15. The limiter wall 210 partially obstructs the needle assembly opening 16. The channel portion 25 is formed integrally as part of the right half 35.

A first locking switch face 60 protrudes from the interior of the housing 10 to the exterior of the housing 10 through a first locking switch opening 65 located on the barrel portion 15 of the left half 35. A safety button 70 face 77 protrudes through a safety button opening 78 on the exterior of the barrel portion 15 of the left half 35 under the first locking switch face 60. A trigger 40 is pivotally attached to the housing 10 and extends through the trigger slot 21.

Figure 3:
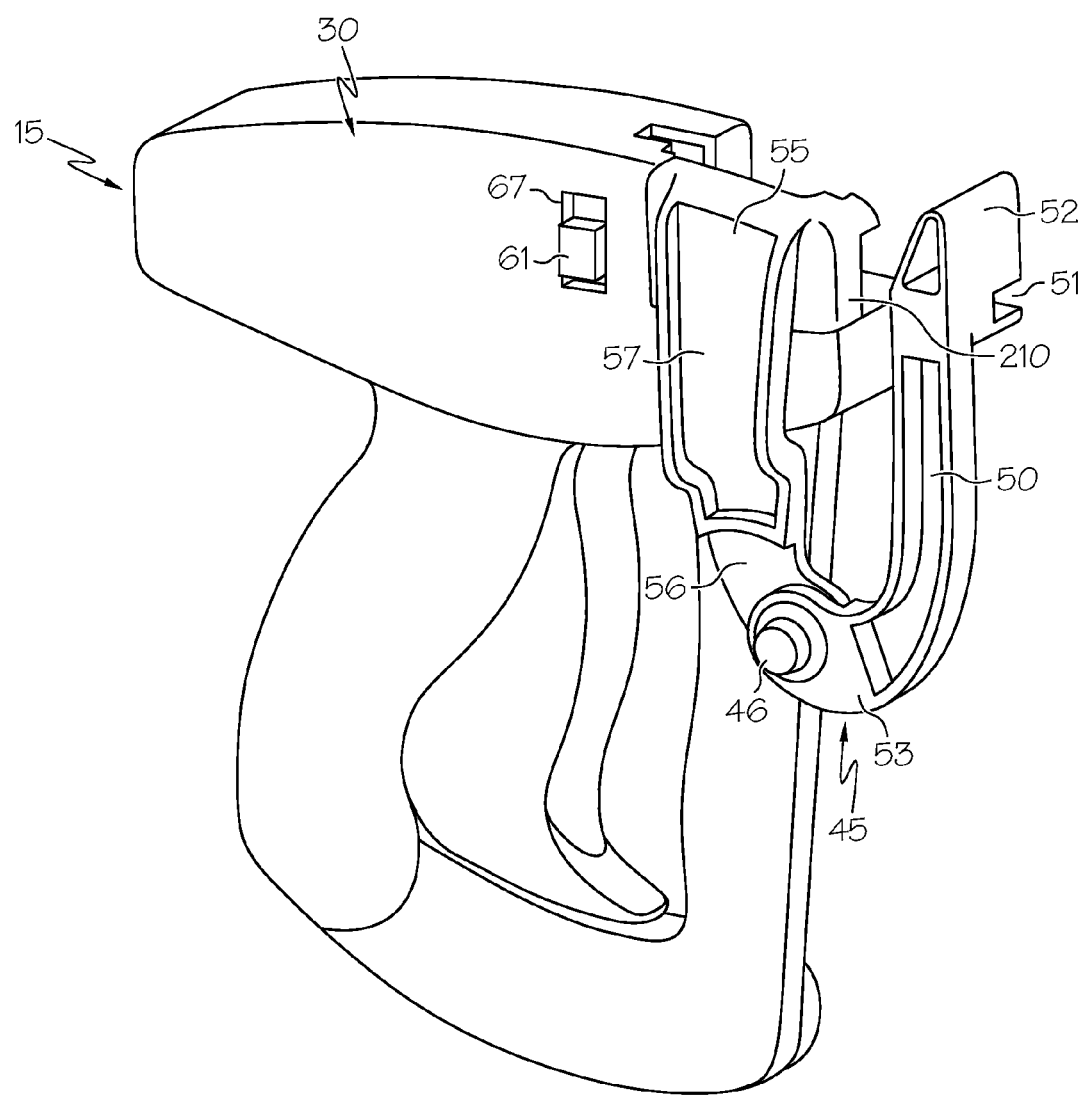
FIG. 3 is a perspective view of the front right side of the present invention in an unexposed articulating needle operating mode.
Figure 4:
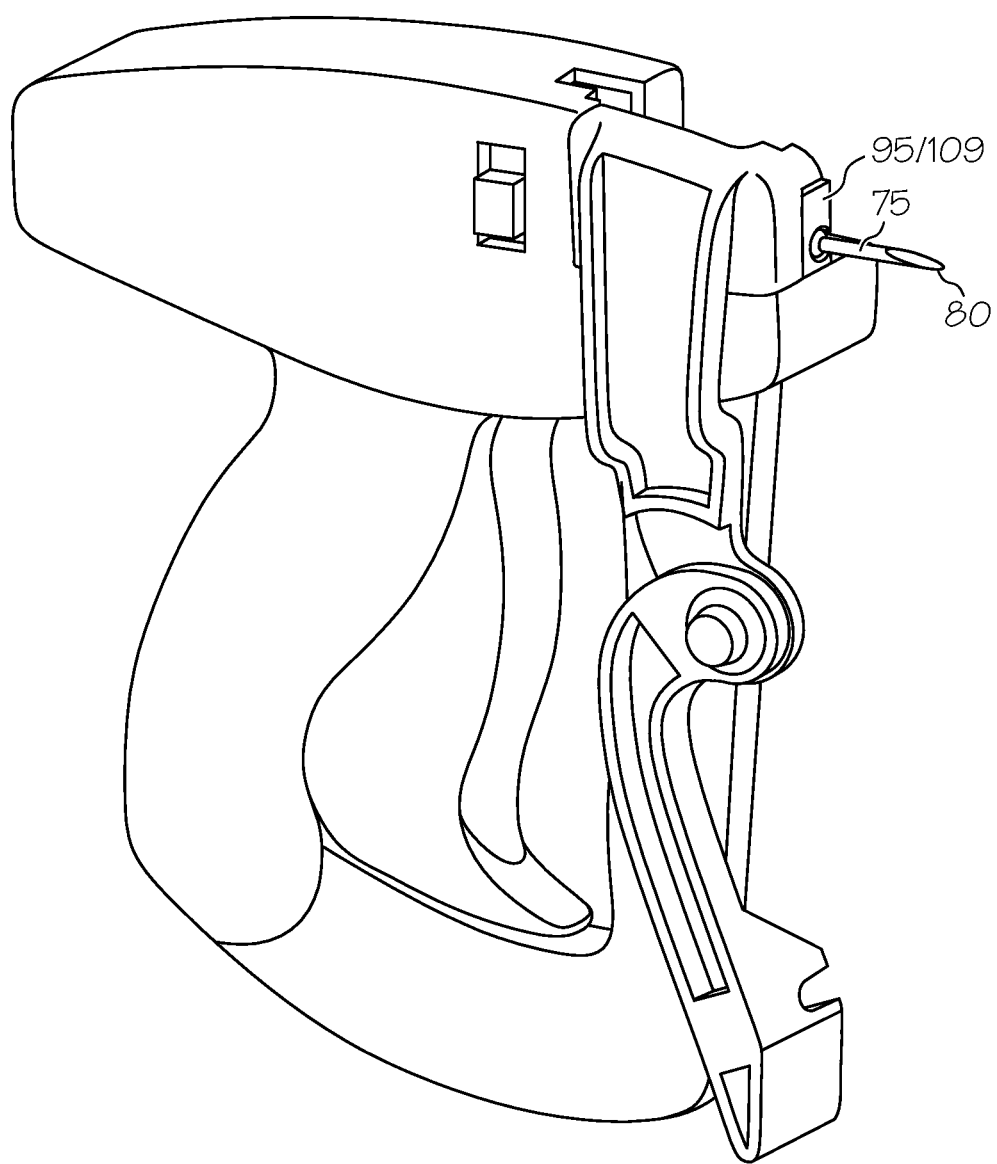
FIG. 4 is a perspective view of the front right side of the present invention in an exposed stationary needle operating mode.

Referring now to FIGS. 3 and 4, the hand tool 1 further has an anvil 45. The anvil 45 has a front portion 50 and a rear portion 55. The front portion 50 has a free end 52 and a hinged end 53. The rear portion 55 has a hinged end 56 and a fixed end 57. The fixed end 57 of the rear portion 55 is attached to the front of the barrel portion 15 of the right half 30 and extends downwardly along the channel portion 20. Alternatively, the rear portion 55 may be formed integrally as part of the right half 35. The hinged end 53 of the front portion 50 is rotatably attached to the hinged end 56 of the rear portion 55 by an anvil hinge 46 so as to allow the free end 52 to rotate about the anvil hinge 46. The front portion 50 has a deep recess 51 formed in the free end 52.

A second locking switch face 61 protrudes through a second locking switch opening 67 located on the barrel portion 15 of the right half 30.

Figure 6:
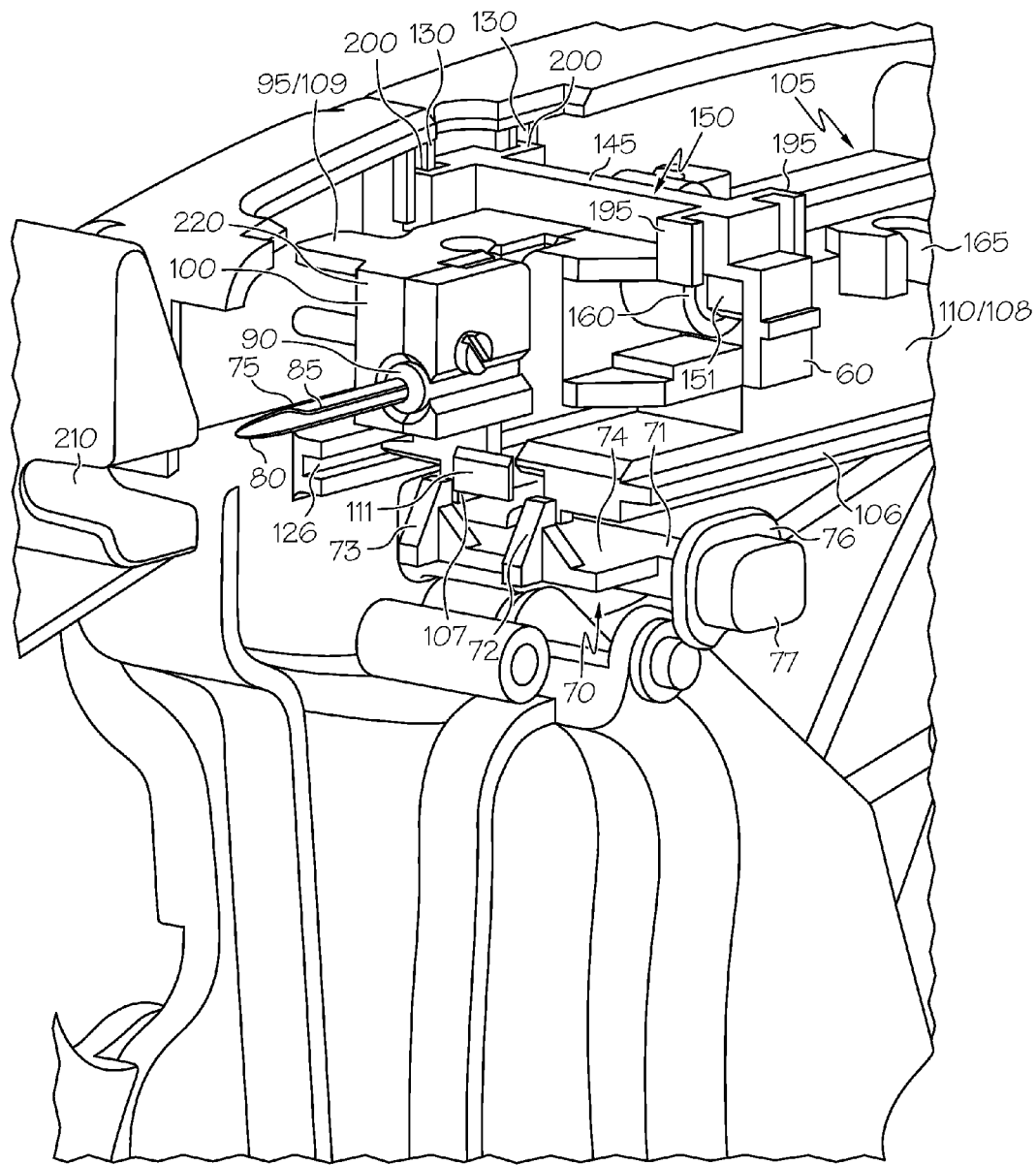
FIG. 6 is an enlarged perspective view of the front left side of the present invention showing the locking button and safety button in detail with part of the casing removed.

As can be seen in FIG. 6, the first locking switch face 60 and the second locking switch face 61 are connected through the barrel portion 15 by a locking switch connector 145. Together, the first locking switch face 60, the second locking switch face 61, and the locking switch connector 145 form a locking switch 150. A first shoulder 151 and a second shoulder 152 extend downwardly from the locking switch connector 145 immediately behind the first locking switch face 60 and second locking switch face 61, respectively.

Figure 5:
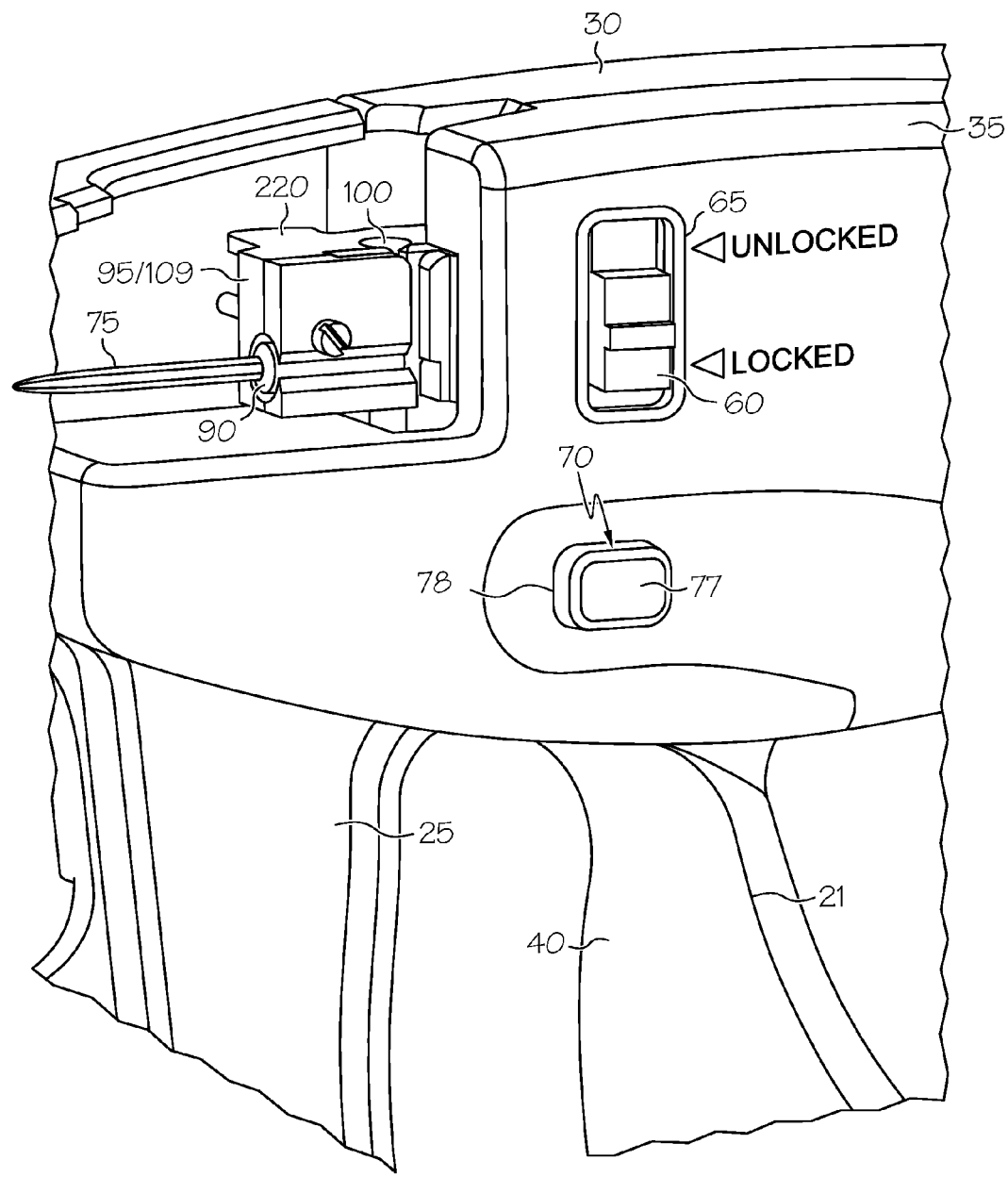
FIG. 5 is an enlarged perspective view of the front left side of the present invention showing the locking button and the safety button in detail.
Figure 7:
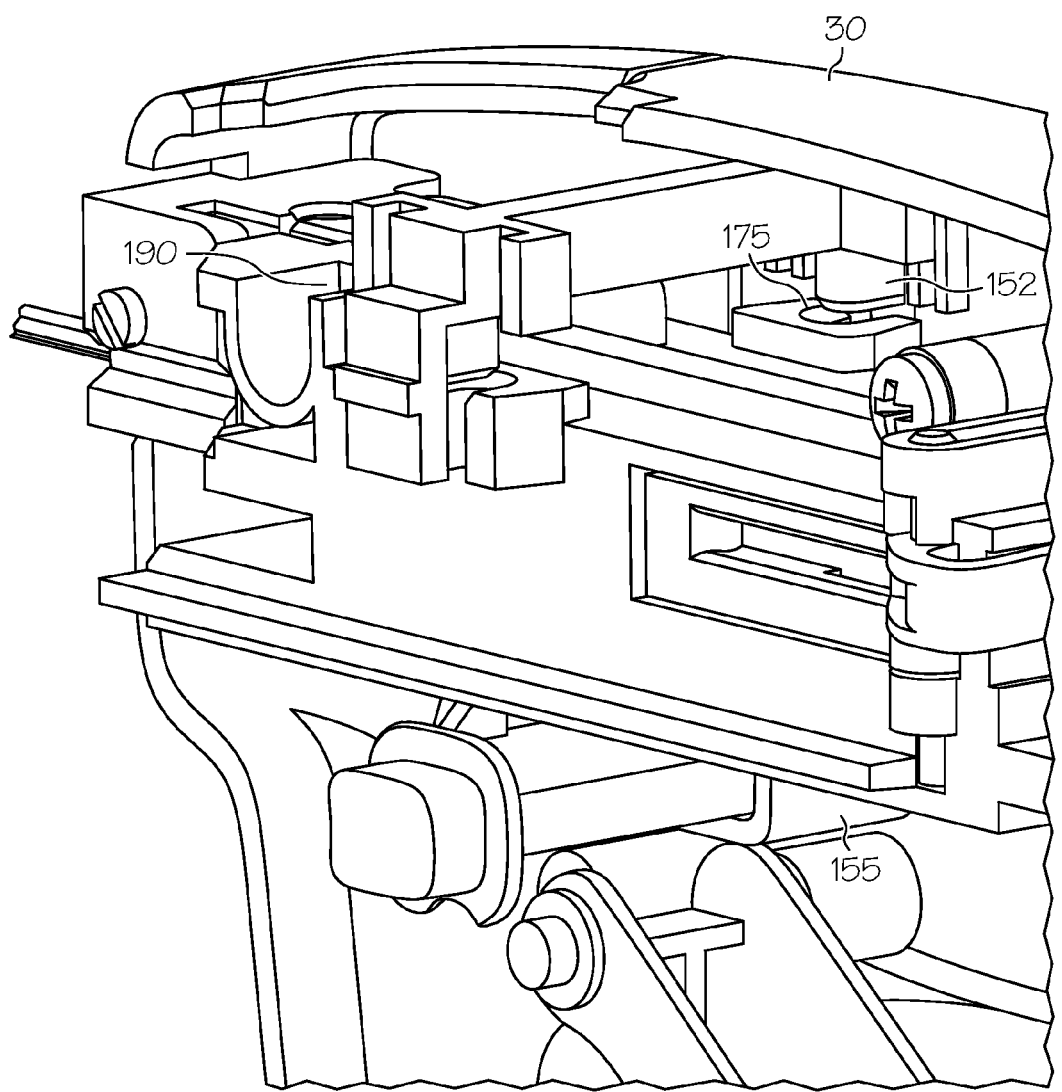
FIG. 7 is an enlarged perspective view of the rear left side of the locking button shown in FIG. 5 in an unlocked position.
Figure 8:
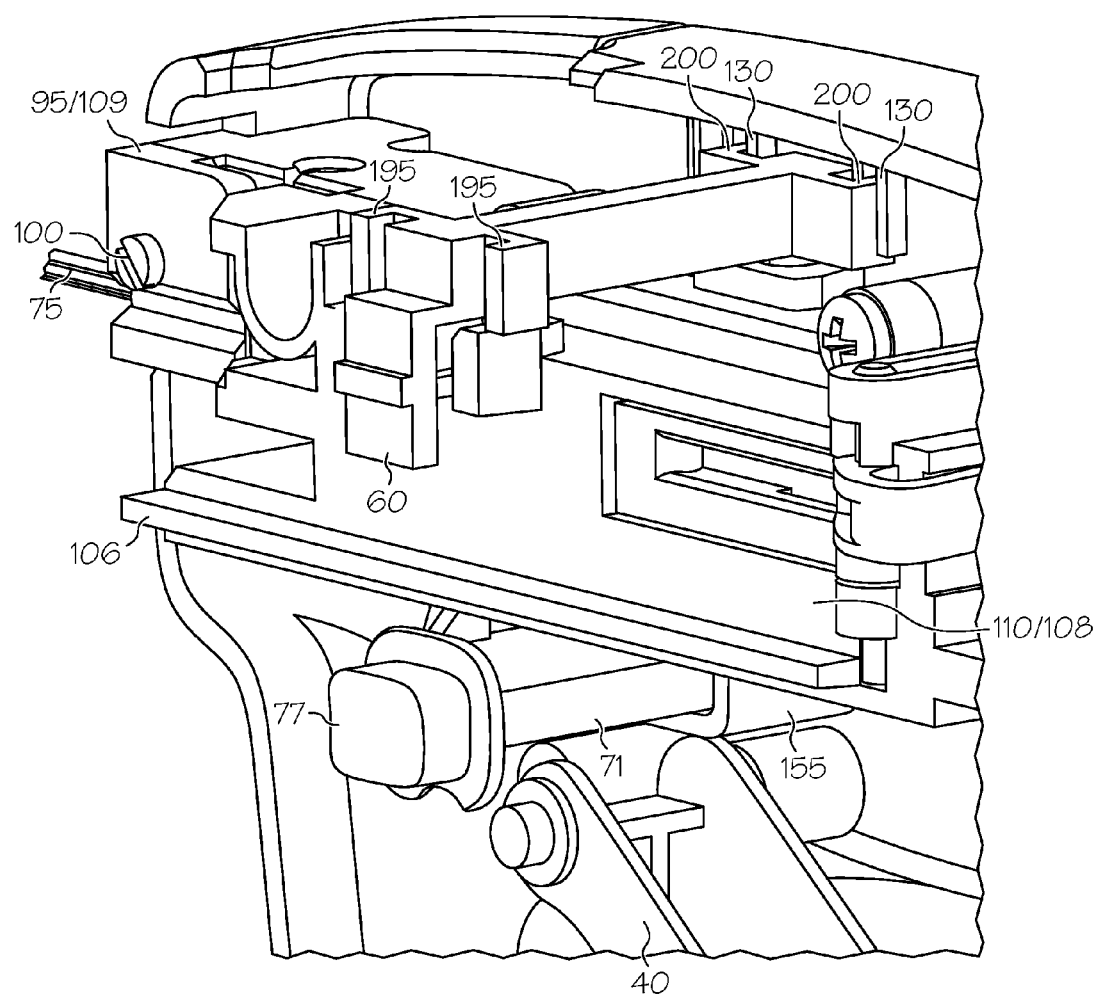
FIG. 8 is an enlarged perspective view of the rear left side of the locking button shown in FIG. 5 in a locked position.

Referring now to FIGS. 5 and 6, the tool further includes a hollow needle 75. The needle 75 has a tip 80, a stem portion 85, and a base portion 90. The base portion 90 is mounted inside a needle slide 95. A limiter 220 extends from the top front edge of the needle slide 95. The base portion 90 is secured to the needle slide 95 by a needle lock 100. A needle slide cover 110 is attached to the needle slide 95. Together, the needle slide 95 and the needle slide cover 110 form a needle assembly 105. When the needle slide 95 and the needle slide cover 110 are secured to one another to form the needle assembly 105, the needle slide cover 110 constitutes a left needle assembly 108, and the needle slide 95 constitutes a right needle assembly 109. The needle assembly 105 has a first projection 96 and a second projection 111. The first projection 96 extends downwardly from the bottom of the left needle assembly 108 and runs along the entire length of the bottom of the left needle assembly 108. The second projection 111 extends downwardly from the bottom of the right needle assembly 109 and runs along the entire length of the right needle assembly 109. A first depression 160 is located near the front of the needle assembly 105 along the top edge of the left needle assembly 108. As can be seen in FIGS. 7 and 8, a screw 190 is driven through the first depression 160 to secure the needle slide 95 and the needle slide cover 110 together. A first locking passage 165 is located along the top edge of the left needle assembly 108 spaced a short distance away from the depression 160 toward the rear of the needle assembly 150. A second locking passage 175 is located along the tope edge of the right needle assembly 109 opposite the first locking passage 165. A first ridge 106 extends lengthwise along bottom edge of the left needle assembly 108, and a second ridge 107 extends lengthwise along the bottom edge of the right needle assembly 109.

A first channel 115 (not shown) is formed on the interior of the barrel portion 15 of the left half 35. A second channel 120 is formed on the interior of the barrel portion 15 of the right half 30. The first and second channels 115, 120 extend substantially parallel from the front to the rear of the barrel portion 15. The first and second channels 115, 120 cooperate with the first and second ridges 106, 107 to slidably secure the needle assembly 105 within the barrel portion 15 and limit the needle assembly 105 to movement parallel lengthwise along the barrel portion 15.

The locking switch 150 includes a pair of first locking switch channels 195 and a pair of second locking switch channels 200. The first locking switch channels 195 are positioned between the first locking switch face 60 and the locking switch connector 145. The second locking switch channels 200 are positioned between the second locking switch face 61 and the locking switch connector 145. A first switch guide 125 (not shown) and a second switch guide 130 cooperate with the locking switch channels 195, 200 to slidably mount the locking switch to the barrel portion 15. The first switch guide 125 is located on the interior of the barrel portion 15 of the left half 35. The second switch guide 130 is located on the interior of the barrel portion 15 of the right half 30. The guides 125, 130 extend substantially perpendicular to the first and second channels 115, 120 and limit the locking switch 150 to perpendicular movement relative to the movement of the needle assembly 105.

The safety button 70 includes an elongated portion 71 that extends away the safety button face 77 toward the interior of the barrel portion 15. A first tooth 72 and a second tooth 73 extend from a shelf 74 that projects from the elongated portion 71. The teeth 72, 73 are spaced apart from one another at a distance approximately equal to the distance between the first projection 96 and the second projection 111. The elongated portion 71 is slidably received within a first tunnel 155. The first tunnel 155 is formed on the inner surface of the barrel portion 15 of the right half 30 and extends toward the left half 35 of the barrel portion 15. An apron 76 surrounds the safety button face 77 and has a dimension slightly larger than that of the safety button opening 78 so as to prevent the elongated portion 71 from sliding completely out of the first tunnel 155.

The operation by which the dual operating mode plastic fastener dispensing hand tool 1 switches between an unexposed articulating needle mode and an exposed stationary needle operating mode will now be explained. It should be noted that operations of the hand tool 1 not pertinent to the present invention are not described in detail herein.

Referring now to FIGS. 1, 3 and 6 the hand tool 1 is shown in an unexposed articulating needle mode. In this mode, the hand tool 1 is best suited to dispense plastic fasteners to maintain certain articles of clothing in a folded condition. The needle assembly 105 is biased toward the rear of the barrel portion 15. The front portion 50 of the anvil 45 is positioned such that the anvil 45 forms a hook type configuration that extends downwardly from the top of the barrel portion 15 and then loops upwardly in front of the barrel portion 15. In this configuration, the deep recess 51 is spaced a short distance from the front of the barrel portion 15 and is aligned with the needle assembly 105 so that the needle 75 may pierce the open space of the deep recess 51 when the needle assembly 105 exits the needle assembly opening 16. Referring now to FIG. 6, the safety button 70 is shown in a default position. In the default position, the first tooth 72 of the safety button 70 is aligned with the first projection 96 of the needle assembly 105, and the second tooth 73 is aligned with the second projection 97. Again referring to FIG. 6, the locking switch 150 is shown in a locked position. In the locked position, the first shoulder 151 of the locking switch 150 is positioned adjacent to, but not within, the first depression 160, and the second shoulder 152 is positioned adjacent to, but not within, the second depression 170. In the default position, the safety button 70 prevents the needle assembly 105 from inadvertently sliding along the first and second channels 115, 120 towards the front of the barrel portion 15. When a worker actuates the trigger 40 without the safety button 70 depressed, the first and second projections 96, 97 will make contact with the first and second teeth 72, 73 as the needle assembly 105 attempts to advance towards the needle assembly opening 16, thereby restraining the needle assembly 105 from any movement.

The safety button 70 must first be depressed to allow the needle assembly 105 to exit from the needle assembly opening 16. Depressing the safety button 70 moves the teeth 72, 73 out of alignment with the projections 96, 97. With the safety button 70 still depressed, the worker can then actuate the trigger 40 to overcome the rearward bias of the needle assembly 105 and move the needle assembly 105 toward the front of the barrel portion 15. Because the teeth 72, 73 are no longer aligned with the projections 96, 97, the needle assembly 105 is able to slide along the channels 115, 120 and out of the needle assembly opening 16. Specifically, the needle assembly 105 is advanced forward until the sharpened tip 80 of the needle 75 penetrates the open space of the deep recess 51 in the front portion 50 of the anvil 45. Once the front of the projections 96, 97 pass by the teeth 72, 73 the safety button 70 will remain depressed as the teeth 72, 73 continually press against the elongated portion of the projections 96, 97 while the needle assembly 105 advances forward and remains at the front of the barrel portion 15. The needle assembly 105 is prevented from advancing beyond this point through contact between the outer surface of the needle assembly passages 165, 175 and the locking switch shoulders 151, 152. Once the worker releases the trigger 40, the rearward bias of the needle assembly 105 retracts the needle assembly back toward the rear of the barrel portion until the front of the projections 96, 97 pass by the teeth 72, 73 allowing the safety button 70 to return to the default position, thus once again restraining the needle assembly 105 from any movement until the safety button 70 is again depressed.

With the hand tool 1 in the unexposed articulating needle mode, the hand tool 1 can be used to dispense plastic fasteners to maintain certain articles of clothing (shirts, pants, intimates, outer wear, socks, etc.) in a folded condition in the following manner. A worker takes an article of clothing that has been folded and places a portion of the article of clothing between the deep recess 51 of the front portion 50 of the anvil 45 and the front of the barrel portion 15. With the safety button 40 depressed, the worker actuates the trigger 40 to advance the needle assembly 105 forward until the sharpened tip 80 of the needle 75 is driven through the portion of the folded article of clothing and penetrates the open space of the deep recess 51. Further actuation of the trigger 40 by the worker causes a plastic fastener to be dispensed through the portion of the folded article of clothing and out of the sharpened tip 80 of the hollow needle 75, thereby maintaining the article of clothing in the folded condition. Once the plastic fastener is dispensed from the hand tool 1, the worker can then release the trigger 40 to allow the needle assembly 105 to retract into the barrel portion 15 as a result of the rearward bias, thus allowing the worker to reposition the hand tool 1 to repeat the process on another portion of the folded article of clothing.

Referring now to FIGS. 2, 4, 7, and 8, the hand tool 1 is shown in an exposed stationary needle mode. In this mode, the hand tool 1 is best suited to dispense plastic fasteners to attach labels, price tags, or other items to articles. The front portion 50 of the anvil 45 is swung downwards such that free end 52 of the front portion 50 is positioned near the bottom of the channel portion 25. It is contemplated that the front portion 50 of the anvil 45 may held in position through friction between the rear portion 55 hinged end 56 and the front portion 50 hinged end 52 such that the front portion 50 may be maintained in an infinite amount of positions between the unexposed articulating needle mode and the exposed stationary needle mode. Alternatively, it is contemplated that the front portion 50 may be held in position through a hinge locking mechanism. In this alternative embodiment, the front portion 50 of the anvil would freely swing about the hinge 46 between the unexposed articulating needle position and the exposed stationary needle position when not locked into either of these positions by the hinge locking mechanism.

Now focusing on FIGS. 7 and 8, the transition between the unexposed articulating needle mode to the exposed stationary needle mode will now be set forth. As explained in detail above, the default position of the safety button 70 prevents the needle assembly 105 from exiting the needle assembly opening 16. In order for the needle assembly 105 to exit from the needle assembly opening 16, the safety button 70 must first be depressed. With the safety button 70 still depressed, the worked can actuate the trigger 40 to overcome the rearward bias of the needle assembly 105 and advance the needle assembly 105 toward the front of the barrel portion 15. However, the needle assembly 105 will be unable to fully move into the exposed stationary needle position, as the outer surface of the locking passages 165, 175 contact the locking switch shoulders 151, 152 once the front of the needle base portion 90 is advanced to a position almost completely flush with the front of the barrel portion 15. For the needle assembly 105 to completely reach the exposed stationary needle position, the locking switch 150 must be moved out of the locked position upward, away from the top of the needle assembly 105 to allow the locking passages 165, 175 to pass under the locking switch shoulders 151, 152. The needle assembly 105 can then be advanced until the limiter 220 strikes the limiting wall 210, preventing any further advancement of the needle assembly 105. The needle base portion 90 will now be completely flush with the front of the barrel portion 15, and the locking switch 150 can be released. Because the needle assembly 105 is now positioned at the front of the barrel portion, the locking switch shoulders 151, 152 locate themselves within the locking passages 165, 175 as the locking switch 150 returns to the locked position, thus locking the needle assembly 105 into the exposed stationary needle position.

With the hand tool 1 in the exposed stationary needle mode, the hand tool can be used to dispense plastic fasteners to attach labels, price tags, or other items to articles in the following manner. A worker passes the sharpened tip 80 of the hollow needle 75 through a label that the worker desires to attach to an article of clothing. Alternatively, the worker may pass the sharpened tip 80 of the hollow needle 75 through a pre-punched hole provided on the label. With the needle 75 passing through the label, the worker then drives the sharpened tip 80 of the hollow needle 75 completely through the article of clothing. The worker then actuates the trigger to dispense a plastic fastener through the label and article of clothing out of the sharpened tip 80 of the hollow needle 75, thereby securing the label to the article of clothing. Once the plastic fastener is dispensed from the hand tool 1, the worker can release the trigger 40 and remove the needle 75 from the label and article of clothing, thus allowing the worker to repeat the process with another label and article of clothing.

Once it is desired to return the needle assembly 105 back to the unexposed articulating needle position, the worker can move the locking switch 150 out of the locked position, thereby removing the shoulders 151, 152 from the locking passages 165, 175. Because the needle assembly 105 is biased toward the rear of the barrel portion 15, the needle assembly 105 will return toward the rear of the barrel portion 15 once the shoulders 151, 152 are removed from the locking passages 165, thus returning the needle assembly 105 back to the unexposed articulating needle position. It is not necessary to depress the safety button 70 before returning the needle assembly 105 back to the unexposed articulating needle position because, as explained in detail above, the safety button 70 remains depressed while the needle assembly 105 is at the front of the barrel portion 15.

It is contemplated that the hand tool may be manufactured without the limiter wall 210 or the limiter 220 to allow the needle assembly 105 to be removed through the needle assembly opening 16 to facilitate the repair or inspection of the hand tool 1. To completely remove the needle assembly 105 from this alternate embodiment of the hand tool 1, the worker begins by performing the steps required to transition the hand tool 1 from the unexposed articulating needle mode to the exposed stationary needle mode, as discussed in detail above. Once the worker reaches the step of releasing the locking switch 150 once the front of the needle base portion 90 is completely flush with the front of the barrel portion 15, the worker instead grasps and pulls the needle assembly 105 through the needle assembly opening 16 and completely out of the hand tool 1.

It will thus be seen that a novel plastic fastener dispensing hand tool that can be operated in an exposed stationary needle mode and an unexposed articulating needle mode has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A dual operating mode hand tool for dispensing plastic fasteners, comprising:
    a gun shaped casing, said casing having a barrel portion, a handle portion with a front and rear, and a channel portion having a bottom, said casing further having a needle assembly opening at the front of the barrel portion and a trigger slot on the front of said handle portion;
    a hollow needle;
    a needle assembly, said needle assembly being slidably movable back and forth between a retracted position disposed substantially within said casing and an extended position disposed substantially out of said casing through an opening in said casing, a needle disposed on one end of said needle assembly;
    a trigger, said trigger being pivotally mounted within said casing and extending out from a trigger slot, said trigger being capable of moving said needle assembly between the retracted and extended positions;
    a locking switch, said locking switch being capable of selectively locking said needle assembly in the extended position;
    a safety button, said safety button being capable of preventing said needle assembly from moving from the retracted position; and
    an anvil, said anvil having a front portion and a rear portion, said rear portion being secured to said casing, said front portion being rotatably attached to said rear portion, said front portion being capable of being rotated to a first position where the front portion extends in front of said needle opening or a second position where the front portion extends towards the bottom of said channel portion.

2. The dual operating mode hand tool for dispensing plastic fasteners as defined in claim 1, wherein said front portion is held in the first position or the second position by friction.

3. The dual operating mode hand tool for dispensing plastic fasteners as defined in claim 1, wherein said front portion is held in the first position or the second position by a locking mechanism.

4. The dual operating mode hand tool for dispensing plastic fasteners as defined in claim 1, wherein said needle assembly can be completely removed from said hand tool through said needle assembly opening.

5. The dual operating mode hand tool for dispensing plastic fasteners as defined in claim 1, wherein the anvil further includes a needle guard.

6. The dual operating mode hand tool for dispensing plastic fasteners as defined in claim 5, wherein the needle guard has a static portion and a dynamic portion, said dynamic portion being mounted within, and biased away from, said static portion.

7. The dual operating mode hand tool for dispensing plastic fasteners as defined in claim 6, wherein the needle guard has a circular passage and a needle sight.

8. The dual operating mode hand tool for dispensing plastic fasteners as defined in claim 6, wherein the dynamic portion is biased by a coil spring.

9. The dual operating mode hand tool for dispensing plastic fasteners as defined of claim 6, wherein the dynamic portion is biased by a resilient plastic tab.

10. The dual operating mode hand tool for dispensing plastic fasteners of claim 6, wherein the static portion and the dynamic portion each have a ramp for guiding fabric into a fabric slot.

11. The dual operating mode hand tool for dispensing plastic fasteners as defined in claim 5, wherein the needle guard has a needle access door.

12. The dual operating mode hand tool for dispensing plastic fasteners of claim 1, wherein at least one plastic fastener is provided for use with the hand tool.

13. A dual operating mode hand tool for dispensing plastic fasteners, comprising:
    a casing, said casing being provided with a needle assembly opening;
    a hollow needle;
    a needle assembly, said needle assembly being slidably movable back and forth between a retracted position disposed substantially within said casing and an extended position disposed substantially out of said casing through an opening in said casing, a needle disposed on one end of said needle assembly; and
    an anvil, said anvil having a front portion and a rear portion, said rear portion being secured to said casing, said front portion being rotatably attached to said rear portion, said front portion being capable of being rotated to extend in front of said opening in said needle assembly.

14. The dual operating mode hand tool for dispensing plastic fasteners as defined in claim 13, wherein said hand tool further has a locking switch, said locking switch being capable of selectively locking said needle assembly in the extended position.

15. The dual operating mode hand tool for dispensing plastic fasteners as defined in claim 14, wherein said hand tool further has a safety button, said safety button being capable of preventing said needle assembly from moving from the retracted position.

16. The dual operating mode hand tool for dispensing plastic fasteners as defined in claim 15, wherein said casing has a barrel portion, a handle portion, and a channel portion.

17. The dual operating mode hand tool for dispensing plastic fasteners as defined in claim 16, wherein said handle portion is provided with a trigger slot, said hand tool further having a trigger pivotally mounted within said casing and extending out from said trigger slot, said trigger being capable of moving said needle assembly between the retracted and extended position.

18. The dual operating mode hand tool for dispensing plastic fasteners of claim 14, wherein the locking switch is includes first and second locking shoulders to form a locking passage.

19. The dual operating mode hand tool for dispensing plastic fasteners of claim 18, wherein the first and second locking shoulders are moved into and out of position with the locking passage.

20. The dual operating mode hand tool for dispensing plastic fasteners of claim 13, wherein the hollow needle is provided with a needle casing.

21. The dual operating mode hand tool for dispensing plastic fasteners of claim 20, wherein the needle casing is used to remove a worn needle from the hand tool.

22. The dual operating mode hand tool for dispensing plastic fasteners of claim 13, wherein at least one plastic fastener is provided for use with the hand tool.

\* \* \* \* \*